(12) United States Patent
Seeman et al.

(10) Patent No.: US 6,840,060 B2
(45) Date of Patent: Jan. 11, 2005

(54) METHODS FOR ACHIEVING OPERATING TEMPERATURE OF GLASS CONTACTING SURFACES OF GLASS FORMING EQUIPMENT, AND GAS MIXTURE THEREFOR

(76) Inventors: Thomas A. Seeman, 200 Superior St., Rossford, OH (US) 43460; Peter T. Eagle, 200 Superior St., Rossford, OH (US) 43460

( * ) Notice: Subject to any disclaimer, the term of this patent is extended or adjusted under 35 U.S.C. 154(b) by 0 days.

(21) Appl. No.: 09/847,634

(22) Filed: May 2, 2001

(65) Prior Publication Data

US 2001/0035028 A1 Nov. 1, 2001

Related U.S. Application Data

(60) Provisional application No. 60/202,502, filed on May 5, 2000.

(51) Int. Cl.$^7$ ............................................... C03B 40/02
(52) U.S. Cl. ............................... 65/26; 65/168; 65/169; 65/265; 65/267; 65/319; 65/326; 65/355
(58) Field of Search ............................... 65/26, 27, 168, 65/169, 265, 267, 319, 326, 355

(56) References Cited

U.S. PATENT DOCUMENTS

| | | | | |
|---|---|---|---|---|
| 3,377,389 A | * | 4/1968 | Griesbaum | .................. 558/433 |
| 3,455,514 A | * | 7/1969 | Fenley, Jr. | .................. 239/419 |
| 4,333,756 A | * | 6/1982 | Seeman | .......................... 65/24 |
| 4,498,918 A | * | 2/1985 | Seeman | ...................... 65/25.1 |
| RE34,785 E | * | 11/1994 | Virey | .............................. 65/26 |
| 5,679,409 A | * | 10/1997 | Seeman | ...................... 427/133 |
| 5,746,800 A | * | 5/1998 | Ambrogio | ................ 249/114.1 |
| 5,888,266 A | * | 3/1999 | Eagle et al. | .................. 264/81 |
| 6,068,889 A | * | 5/2000 | Seeman | ...................... 427/133 |

* cited by examiner

*Primary Examiner*—Sean Vincent
(74) *Attorney, Agent, or Firm*—David C. Purdue; John C. Purdue

(57) ABSTRACT

Method of heating glass contacting surfaces, comprising heating the glass contacting surfaces to a predetermined operating temperature by combustion of a hydrocarbon fuel gas mixture which includes 90% by volume of MAPP gas and 10 percent by volume of propane. Another method blends the MAPP with air and/or natural gas. A novel hydrocarbon fuel gas mixture which includes 90% by volume of MAPP gas and 10% by volume of propane.

12 Claims, 1 Drawing Sheet

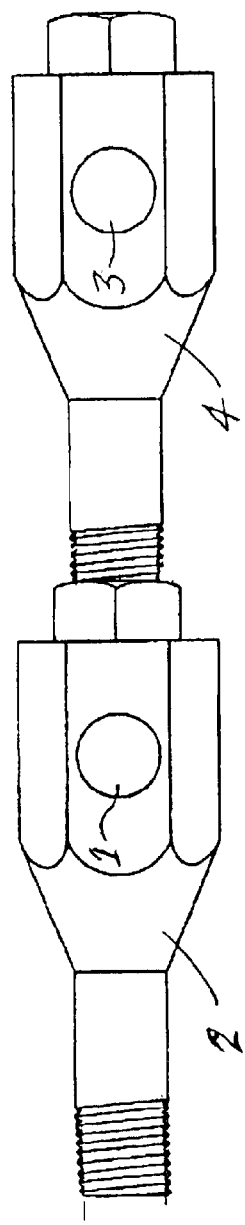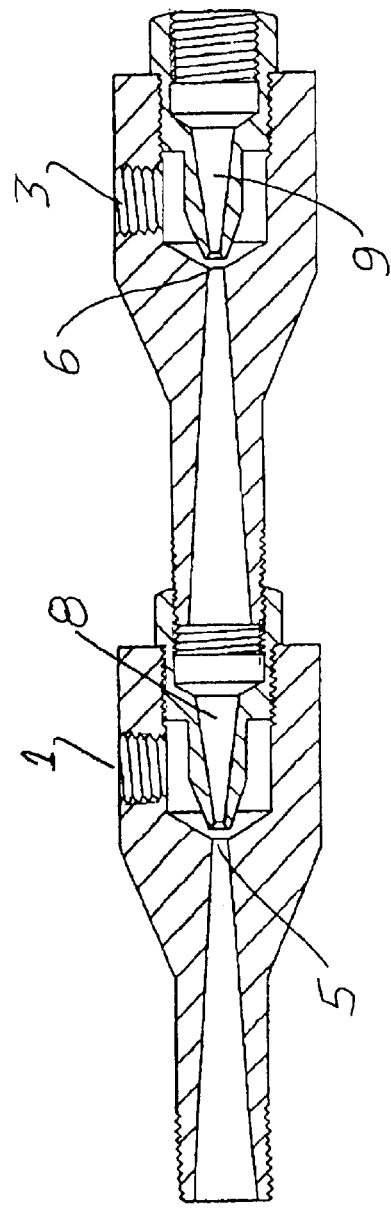

METHODS FOR ACHIEVING OPERATING TEMPERATURE OF GLASS CONTACTING SURFACES OF GLASS FORMING EQUIPMENT, AND GAS MIXTURE THEREFOR

This patent application is a continuation-in-part of and claims priority from U.S. Provisional Patent Application Ser. No. 60/202,502 filed on May 5, 2000.

BACKGROUND OF THE INVENTION

1. Field of the Invention

The present invention relates to methods for heating the glass contacting surfaces of glass forming equipment to a proper working temperature, and to an improved hydrocarbon fuel gas mixture especially suited for said methods and lubricating purposes.

2. Description of the Prior Art

Pressed glass articles, e.g., tableware, lenses, glass blocks, white ware and crystal ware, are usually made by placing a charge of heat-softened glass, commonly known as a "gob", in the cavity of a mold, and then advancing a plunger, under pressure, into the mold. Modern manufacturing processes, which generally enable large quantities of pressed glass articles of precise dimensions to be produced in a relatively short time, usually employ a plurality of molds. The cavities of the molds are charged with gobs of softened glass from a central reservoir, and the gobs are formed into pressed articles by advancing into the molds plungers driven, for example, hydraulically or by air. Typically, automated pressing operations are used. In such operations several molds are mounted on a circular table and rotated step by step to bring each mold, in turn, below a charging device, then to a pressing station and, finally, to a station where the pressed articles are removed from the molds.

Glass is also formed in press and blow machines, such as the H-28 press and blow machine, which used to have twelve stations, but now have eighteen stations. Achieving and maintaining the glass contacting surfaces of press and blow machines is critical to producing quality glassware.

Heretofore, molds, plungers and other glass contacting elements of glass forming equipment have been heated, prior to forming glassware, by depositing gobs of glass on the surfaces and allowing the glass to heat the glass contacting element to a good working temperature. This heating has been augmented, in some cases, with steam or the combustion of natural gas or ethyl acetylene. In glass forming equipment with cast iron glass contacting elements, 600° F. is a good working temperature. More recently, molds, plungers and other glass contacting elements of glass forming equipment have been made from stainless steel which has a much higher working temperature of above 800° F. The prior art reliance on gobs of glass, with or without supplemental heating, made the time required to heat glass contacting elements to a suitable working temperature dependent upon the mass of the glass. Typically, this takes about thirty minutes.

Today, commercial glassware production involves many short, but fast, runs of glassware with intermediate changes in molds and the like. Consequently, today, a higher proportion of glass forming time is required to bring glass contacting elements up to working temperatures. As a result, it is more important than ever to expedite the heating of glass contacting elements of glass forming equipment to a suitable working temperature.

Particularly in automated glass pressing operations, a major consideration has been the need to heat glass contacting elements to a working temperature to prevent formed glass from crizzling due to insufficient working temperature. If the temperature of the mold or plunger or other glass containing surface is not maintained as a suitable working temperature, for example, 800° F. for stainless steel elements, or is permitted to fall below a suitable working temperature during a run, wrinkles, checks and other imperfections can result in the finished article.

Today, some glass contacting elements are heated by contact with glass gobs and the combustion of a mixture of combustible gases, namely, 75% by volume of MAPP gas, a mixture of methylacetylene, propadiene and propylene, which is commercially available from Petromont of Canada, and 25% by volume of propane. Better heating of glass contact surfaces is needed, however, especially in view of the tendency toward shorter runs and longer downtime while glass contacting elements are brought up to a suitable working temperature according to the prior art.

In glass operations today, the main hydrocarbon used is acetylene gas. Because of the complex chemical attributes of acetylene, hot spots in molds and other glass contacting surfaces and carbon breakdown cause major problems in production runs and air quality standards. Because acetylene is a 100% triple bonded carbon, the release of heat energy and carbon combustion is too abundant for many types of mold compositions.

Furthermore, in today's glass plant operations, the variety of glass items, the variety of mold materials, and the increased short runs makes the requirements for quick mobility and instant operation production very essential. The set point must be attained quickly with a gas flame system.

It is a desideratum of the present invention to avoid the animadversions of the prior art.

SUMMARY OF THE INVENTION

The present invention provides a method of heating glass contacting surfaces, comprising the steps of: heating said glass contacting surfaces to a predetermined operating temperature; said heating of said glass contacting surfaces is accomplished by combustion of a predetermined gas in a flame; and said predetermined gas comprises a hydrocarbon fuel gas mixture which includes approximately 90% by volume of MAPP gas.

The present invention further provides a hydrocarbon fuel gas mixture especially suited for heating glass contacting surfaces and/or mold release, comprising a hydrocarbon fuel gas mixture which includes approximately 90% by volume of MAPP gas.

The instant invention is based upon the discovery of an improved method for heating glass contacting elements to the proper working temperature, for example, prior to the start of a production run. According to the method, a hydrocarbon fuel gas mixture, comprising approximately 90% by volume of MAPP gas (i.e., the MAPP gas used is available from any commercial petrochemical stream under the indicated name) with the balance primarily propane, is delivered to or near the glass contacting surface where its combustion heats the glass contacting surface of such elements.

The present invention also provides a method of heating glass contacting surfaces, comprising the steps of: heating said glass contacting surfaces to a predetermined operating temperature; said heating of said glass contacting surfaces is accomplished by combustion of a predetermined gas in a flame; said heating of said glass contacting surfaces is started with a 100% mixture of MAPP gas to limit carbon skeleton formation; then there is introduced a small quantity of natural gas which has extra hydrogen atoms to give a suppressive influence for carbon formation; and said heating of said glass contacting surfaces is maintained to avoid any chance of dirty glass contacting surfaces.

The present invention also provides a method of heating glass contacting surfaces, comprising the steps of: heating said glass contacting surfaces to a predetermined operating temperature; said heating of said glass contacting surfaces is accomplished by combustion of a predetermined gas in a flame; said heating of said glass contacting surfaces is started with a 100% mixture of MAPP gas to limit carbon skeleton formation; then said MAPP gas is mixed with air to produce a heat transfer system which will maintain a sustained temperature on the average of 1800 K; and said heating of said glass contacting surfaces is maintained to avoid any chance of dirty glass contacting surfaces.

Accordingly, it is an object of this invention to provide an improvement in a method for heating the glass contacting elements of glass forming equipment to a suitable working temperature.

It is a further object of the present invention to provide an improved hydrocarbon fuel gas mixture especially suited for heating the glass contacting surfaces of glass forming equipment to a proper working temperature and maintaining these surfaces at that temperature.

These and other objects and advantages of the invention will be apparent from the description which follows and the accompanying drawings.

BRIEF DESCRIPTION OF THE DRAWINGS

FIG. 1 is a perspective view of a venturi arrangement used in accordance with the present invention.

FIG. 2 illustrates a central sectional view of the FIG. 1 embodiment.

DETAILED DESCRIPTION OF THE INVENTION

According to one aspect of the present method for heating glass contacting surfaces in glass forming equipment, a hydrocarbon fuel gas mixture, comprising about 90 percent by volume MAPP gas and about 10 percent by volume propane, is burned in a flame which is directed at glass contacting surfaces to heat those surfaces to a proper operating temperature before production begins and/or to maintain those surfaces at the proper operating temperature during production.

By comparison with prior art gas mixtures comprising about 75 percent by volume MAPP and about 25 percent by volume propane which produces about 2,050 BTUs cubic foot, the hydrocarbon fuel gas fuel gas mixture according to the present invention produce 2,450 BTUs per cubic feet. It is the increased heat output resulting from the combustion of the present hydrocarbon fuel gas mixture that establishes it as a premier hydrocarbon fuel used solely for heating gas contacting surfaces of glass forming equipment.

There are many problems associated with contact between gobs of softened glass and glass contacting surfaces which are not hot enough or are not heated evenly over the extent of the glass contacting surfaces. Cold molds cause chill wrinkles in glassware as well as settle waves. In extreme cases, where the glass contacting surface is far too cold, the glass will simply adhere to the glass contacting surface requiring machines to be shut down to remove the glass.

It has been determined that the combustion of the present hydrocarbon fuel gas mixture heats molds faster than the prior art gas mixtures, allowing the operators to heat glass contacting surfaces quickly and more evenly, thus eliminating many prior art problems which resulted from inadequate temperatures of glass contacting surfaces.

In the H-28 press and blow machine mentioned above, prior art attempts to obtain and/or maintain the proper working temperature of glass contacting surfaces, entailed the combustion of a mixture comprising 75 percent by volume of MAPP and 25 percent by volume of propane adjacent to a single one of the twelve stations. In the newer, eighteen station H-28 machines, even with the enriched hydrocarbon fuel gas mixture of the present invention, the gas is delivered to two of the eighteen stations to provide adequate heat, and this hydrocarbon fuel mixture does an outstanding job of heating th molds to the proper operating temperature and maintaining that temperature.

It will be appreciated that, in addition to providing an improved method for heating the largely conventional glass forming apparatus described herein, the invention can be applied to advantage to a method for heating virtually any glass contacting surface involved in producing glass articles. Suitable apparatus can include, for example, a plunger surrounded by a manifold which contains a plurality of tubes or cavities in which hydrocarbon fuel gas mixture according to the present invention can circulate, and from which the mixture can flow to provide the required heating. In addition, apparatus including a manifold with externally-mounted heating means, comprising tubes and vessels to contain the gas, can be used. Numerous other ways of achieving the advantages of heating according to the invention by applying the improvements thereof in to various methods employing many different types of glass pressing and glass pressing and blowing apparatus, will also be apparent those skilled in the art.

Also, because of the increase in BTU content of the improved hydrocarbon mixture, the present invention and discovery applies to and has utility for any glass contacting surface. The added heat value acts as a pre-heat of the glass contacting surface. Then, a secondary by-product of carbon actually insulates the glass contacting surface and acts as a thermal barrier. Some examples would be ring and plunger and molds of press machines, H-28 machines, I.S. machines CRT machines, panel machines, spinning machines, formers, conveyors, Lehr chains, vacuum cup and dead plates. As the basic scientific principle of this invention remains the same, it applies to but is not limited to any of the above mentioned examples.

Another aspect of the present invention is based upon the discovery of a method for applying MAPP gas for better heat control and suppression of carbon soot particulate aggregation.

In one aspect of the present invention, the new system will produce no triple bonds of carbon production. Under this system, the flame reactions will reach an equilibrium producing carbon, carbon dioxide, carbon monoxide and water. This novel system in accordance with the present invention will produce no triple bonded carbon particulate aggregation.

For heat control of mold temperature, the system in accordance with one aspect of the present invention will keep a sustained temperature on the average of 1800 K. Because of the triple bond aggregates of acetylene, heat control becomes inconsistent. The acetylene flame can change from 1900 K to a low of 1500 K. This happens when the tripled bonded carbon molecules break down so fast that the flame is cooled very rapidly. This heat loss is detrimental to a consistent heat transfer in the mold.

A method in accordance with the present invention which will now be described is to attain a balance of letting unsaturated hydrocarbons release heat and produce carbon thermal barriers in a uniform process. The novel system is designed to suppress and limit the breakdown of the carbon skeleton that occurs in flame propagation. This carbon skeleton is a by-product left after the MAPP flame is used for heat control and mold release control.

The control system in accordance with the present invention starts with a main line of a 100% MAPP gas mixture. With reference to FIGS. 1 and 2, an air line 1 is connected on the left with a venturi 2. On the right there is connected a natural gas line 3 which also runs through a venturi 4. Thus, this main gas line can be blended with air and/or natural gas. As noted in FIGS. 1 and 2, the throat 5 or 6 of each venturi 2 or 4, respectively, has been enlarged. Because of the different density of each gas, back-up pressure can be reduced for a more complete mixing.

Preferably, but not necessarily, there is provided an air inlet 1 from the left side of a control board (not shown). There is also provided a natural gas inlet 3 from the right side of the control board (not shown).

Preferably, but not necessarily, the venturi arrangement is provided with a 0.205 mm throat 5, a 0.205 mm jet 8, a 0.193 mm throat 6, and a 0.193 mm jet 9.

In accordance with one aspect of the present invention, the operation is started with a 100% mixture of MAPP gas. To limit carbon skeleton formation, there is introduced a small quantity of natural gas which has extra hydrogen atoms that give a suppressive influence for carbon formation. This reaction is maintained to avoid any chance of dirty molds or other dirty glass contacting surfaces.

If propagation of carbon skeletons is too abundant, it is advisable to turn off the MAPP gas for a predetermined period of time, e.g. one or two turns of the machine, to restore the mold to a clean condition.

Another option with the system in accordance with the present invention is to again start with a 100% MAPP gas mixture. As indicated above, from the left in FIGS. 1 and 2 there is an air line 1 that is connected with a venturi 2 to the main gas line. The purpose of mixing MAPP with air is to produce a heat transfer system which will maintain at least 1800 K at all times. Because MAPP gas mixtures are over 80% unsaturated gases, flame radiation heat losses can be lessened by the addition of a small quantity of air. From fuel rich to fuel lean mixtures, this method creates an equilibrium which controls the molecular breakdown that usually occurs in the inner cone of the flame.

Some examples are described below.

EXAMPLE 1—MAPP MIXED WITH AIR

1. At the start of production, MAPP gas with addition of approximately 10% air is used. This will cut warm-up time in half. After the warm-up, the system returns to the use of only the MAPP gas.

2. Deep molds may require more velocity to hit bottom. An addition of at least 3% air will add velocity to the flame. In this way, no hot spots will occur in the heat transfer operations.

3. To eliminate check marks on glassware, dead plates and transfer stations, the MAPP gas is mixed with approximately 5% air and this will transfer heat to eliminate cold spots.

EXAMPLE 2—MAPP MIXED WITH NATURAL GAS

1. In ring and plunger assemblies, the MAPP gas is mixed with approximately 40% natural gas to ensure the best heat control to eliminate the condition called glass press-up.

2. When large punch bowls or large pitchers are in production, the best results can be accomplished for heat transfer and carbon control by the addition to the MAPP mixture of at least 20% natural gas. This method gives greater volume to the flame to cover all surfaces of a glass mold.

In recent years, there has been a change to stainless steel molds on press and blow machines, because these molds run hotter than cast iron. By using a solenoid the dwell time of the MAPP gas mixture can be reduced by 50%. With the dwell time so reduced, the hydrocarbon flame does not have the opportunity to consume itself into a complete carbon degradation. Using the aforementioned process, the stainless steel molds run with a MAPP gas mixture run almost 30% longer than acetylene gas.

Furthermore, in the same manner, the MAPP gas lets stainless steel molds run at least 75° F. cooler than with acetylene gas.

Another method in accordance with the present invention is to blend both air and natural gas into the MAPP mixture. This mix produces a new density that provides a different configuration flame. With the added hydrogen from the natural gas and the added air in the inner cone of the flame, a softer carbon skeleton is formed. This particular flame is excellent for chrome-plated molds. The heat transfer generated reduces most crizzle marks and ripple formation that occur when acetylene is used. For this mixture, preferably but not necessarily, there is used approximately 10 parts air, approximately 10 parts natural gas, and approximately 80 parts methylacetylene.

Various changes and modifications are possible from the specific disclosure hereof without departing from the spirit and scope of the instant invention and the preceding description is not intended to impose any limitation thereon other than those set forth in the following claims.

What is claimed is:

1. In a method for heating glass contacting surfaces by combustion of a predetermined gas in a flame, the improvement wherein;

said predetermined gas is initially a mixture containing methylacetylene, propadiene and propylene to limit skeleton formation;

then said predetermined gas is a mixture of from 90 to 97 percent by volume of the mixture containing methylacetylene, propadiene an propylene mixed with from 3 percent to 10 percent by volume of air to produce a heat transfer system which will maintain a sustained temperature on the average of 1800° K.

2. In a method as claimed in claim 1, the improvement wherein said predetermined gas is initially a mixture containing methylacetylene, propadiene and propylene to limit skeleton formation, and then is a mixture of 80 parts by volume of methylacetylene, propadiene and propylene with 10 parts by volume of air and 10 parts by volume of natural gas.

3. A method of heating glass contacting surfaces, comprising the steps of:

at the start of production, heating said glass contacting surfaces using a mixture of methylacetylene, propadiene and propylene with the addition of approximately 10% air, and, after said glass contacting surfaces have warmed-up, said glass contacting surfaces are heated with only said mixture of methylacetylene, propadiene and propylene.

4. A method for heating glass contacting surfaces of glass forming apparatus, said method comprising the step of causing combustion of a fuel gas adjacent the surfaces to be heated so that its combustion causes the heating, wherein, initially, said fuel gas is one containing methylacetylene, propadiene and propylene or a mixture of approximately 90 percent by volume of the gas containing methylacetylene, propadiene and propylene and approximately 10 percent by volume of air, and, thereafter, a second fuel gas is used, said second fuel gas being

- a mixture consisting essentially of approximately 90 percent by volume of the gas containing methylacetylene, propadiene and propylene and approximately 10 percent by volume of natural gas,
- a mixture consisting essentially of approximately 90 percent by volume of said gas containing methylacetylene, propadiene and propylene and approximately 10 percent by volume of air,
- a mixture consisting essentially of approximately 80 percent by volume of said gas containing methylacetylene, propadiene and propylene, approximately 10 percent by volume of air, and approximately 10 percent by volume of natural gas, or
- a mixture consisting essentially of 60 to 80 percent by volume of the gas containing methylacetylene, propadiene and propylene and approximately 20 to 40 percent by volume of natural gas.

5. A method as claimed in claim 4 wherein said fuel gas is one containing approximately 90 percent by volume of the gas containing methylacetylene, propadiene and propylene and approximately 10 percent by volume of air.

6. A method as claimed in claim 4 wherein said fuel gas consists essentially of the gas containing methylacetylene, propadiene and propylene.

7. A method as claimed in claim 5 wherein, the second fuel gas is a mixture consisting essentially of approximately 90 percent by volume of the gas containing methylacetylene, propadiene and propylene and approximately 10 percent by volume of natural gas.

8. A method as claimed in claim 5 wherein, the second fuel gas is a mixture consisting essentially of approximately 90 percent by volume of the gas containing methylacetylene, propadiene and propylene and approximately 10 percent by volume of air.

9. A method as claimed in claim 5 wherein, the second fuel gas is a mixture consisting essentially of approximately 60 to 80 percent by volume of the gas containing methylacetylene, propadiene and propylene and approximately 20 to 40 percent by volume of natural gas.

10. A method as claimed in claim 6 wherein, the second fuel gas is a mixture consisting essentially of approximately 90 percent by volume of the gas containing methylacetylene, propadiene and propylene and approximately 10 percent by volume of natural gas.

11. A method as claimed in claim 6 wherein, the second fuel gas is a mixture consisting essentially of approximately 90 percent by volume of the gas containing methylacetylene, propadiene and propylene and approximately 10 percent by volume of air.

12. A method as claimed in claim 6 wherein, the second fuel gas is a mixture consisting essentially of approximately 60 to 80 percent by volume of the gas containing methylacetylene, propadiene and propylene and approximately 20 to 40 percent by volume of natural gas.

* * * * *